United States Patent [19]
Shi et al.

[11] Patent Number: 5,999,643
[45] Date of Patent: Dec. 7, 1999

[54] SWITCHED-CURRENT TYPE OF HAMMING NEURAL NETWORK SYSTEM FOR PATTERN RECOGNITION

[75] Inventors: Bingxue Shi; Gu Lin, both of Beijing, China

[73] Assignee: Winbond Electronics Corp., Hsinchu, Taiwan

[21] Appl. No.: 09/055,770

[22] Filed: Apr. 6, 1998

[51] Int. Cl.[6] .................................................. G06K 9/62
[52] U.S. Cl. ............................ 382/158; 382/209; 706/31
[58] Field of Search .................................. 382/155, 156, 382/158, 218, 209; 706/31, 30, 20, 18, 33, 38

[56] References Cited

U.S. PATENT DOCUMENTS

| | | | |
|---|---|---|---|
| 5,630,021 | 5/1997 | Li et al. | 706/38 |
| 5,720,004 | 2/1998 | Li et al. | 706/33 |
| 5,751,286 | 5/1998 | Barber et al. | 345/348 |
| 5,799,098 | 8/1998 | Ort et al. | 382/125 |
| 5,835,633 | 11/1998 | Fujisaki et al. | 382/187 |

*Primary Examiner*—Jon Chang
*Assistant Examiner*—Vikkram Bali
*Attorney, Agent, or Firm*—Kolisch Hartwell Dickinson McCormack & Heuser

[57] ABSTRACT

Disclosed is a two-layer switched-current type of a Hamming neural network system. This Hamming network system includes a matching rate computation circuit for modules on a first layer used to compute a matching rate between a to-be-identified pattern and each one of a plurality of standard patterns, a matching rate comparison circuit on a second layer for ranking an order of the matching rates including a switched-current type order-ranking circuit for receiving switched-current signals, finding a maximum value and outputting a time-division order-ranking output and an identification-rejection judgment circuit for performing an absolute and a relative judgment, and a pulse-generating circuit for generating sequential clock pulses, in which the circuit construction of the Hamming network is simple and flexible due to a modular design with extendible circuit dimensions, and a high precision, improved performance and enhanced reliability of the network system is achieved. In addition, the Hamming network can be easily integrated in a mixed analog/digital form due to a direct usage of a standard complementary metal-oxide-semiconductor device by using a switched-current technique.

8 Claims, 4 Drawing Sheets

| SIMULATION RESULT | Iout₀ | Iout₁ | Iout₂ | ε_max |
|---|---|---|---|---|
| 1 | 200.4 | 194.9 | 189.8 | 0.4 |
| 2 | 152.1 | 147.7 | 142.5 | 2.8 |
| 3 | 103.4 | 98.4 | 88.6 | 3.4 |
| 4 | 29.8 | 24.5 | 18.9 | 4.8 |

TABLE 1 (UNIT: μA)

SWITCHED-CURRENT TYPE OF HAMMING NEURAL NETWORK SYSTEM FOR PATTERN RECOGNITION

BACKGROUND OF THE INVENTION

1. The Field of the Invention

The present invention relates to a neural network system, and more particularly to a switched-current type of a Hamming neural network system for pattern recognition with an improved performance and increased reliability for the Hamming neural network system.

2. Description of the Related Art

Currently, an artificial neural network has become a fashionable and popular research topic. The neural network theory is thought to be the way with the highest potential for solving many artificial intelligence problems. However, because a software neural network can not satisfy many applications requiring a real-time processing, a design of a very large scale integrated circuit (VLSI) neural network has become an important research approach.

Due to a high connection density among neurons in many neural networks and a requirement of connection priority values to be flexibly controlled, it is difficult to construct a network including a larger number of neurons by using a VLSI technique. The construction of a Hamming neural network is simple and the value implying the connection priority can be set in advance and then applied to the VLSI circuit in the network in many applications. Therefore, the Hamming neural network has become an essential construction in the integrated circuit neural networks.

In pattern recognition applications, a typical Hamming neural network is of a two-layer construction. A circuit for computing a matching rate between a to-be-identified pattern and a standard pattern is formed on the first layer and a circuit for finding a maximum network, that is, a Winner-Take-All (WTA) network which is used to find a corresponding standard pattern having a maximum matching rate and outputting it as a result is formed on the second layer. Although this typical Hamming neural network is easily constructed, it can only find out the standard pattern which is the one that is most matchable with the to-be-identified pattern. However, with the raising in the complexity of the system, the increasing in the number of the standard patterns, and especially the development of a stage-connected system with multiple stages, this is far from satisfying the performance requirement of the system. To raise the performance of the system, it is very necessary to find two or more standard patterns which are most closely matchable with the to-be-identified pattern based on the matching rates between the standard patterns and the to-be-identified pattern. Therefore, a new developed switched-current Hamming neural network is set forth hereinafter, in which the matching rates can be outputted according to their ranks from high to low and the corresponding standard patterns. Thus, m standard patterns which are the most and more closely matchable with the to-be-identified pattern can be found sequentially where $1 \leq m \leq N$. This will greatly improve the system performances such as the increase of the identification rate, the data reprocessing and reuse of the multi-stage stage-connected system.

Generally, a threshold value is taken for increasing the reliability of the system. This threshold value is a threshold value set in a decision-made phase of the system and is divided into an absolute threshold value and a relative threshold value. Two different threshold values correspond to two identification-rejection (IR) methods which are an absolute IR method and a relative IR method. The absolute IR method indicates that the system produces an IR signal if the maximum matching rate is less than the absolute threshold value, and the relative IR method specifies that the system generates an IR signal when a difference value between the maximum matching rate and a second maximum matching rate is less than the relative threshold value. Since the typical Hamming neural network can only perform a maximum-finding operation, it can merely carry out an absolute IR judgment but can not make a relative IR judgment. However, performing the relative IR judgment in many practical applications will more greatly increase the reliability of the system than that of the absolute IR judgment. Thus, the present invention discloses an IR circuit which has a simple construction and a good performance and makes both the absolute IR and the relative IR judgments.

SUMMARY OF THE INVENTION

The present invention is directed to a switched-current type of Hamming neural network system for pattern recognition.

An objective of the present invention is to provide a switched-current type of Hamming neural network system for pattern recognition to achieve an improved performance and enhanced reliability for the Hamming neural network system.

In accordance with one aspect of the invention, there is provided a switched-current type of Hamming neural network system, including a matching rate computation circuit for modules being on a first layer and used to compute a matching rate between a to-be-identified pattern and each one of a plurality of standard patterns defined by an output of a corresponding standard pattern in which each neuron is composed of a current mirror comprising two transistors in a series connection and an input terminal of each neuron is connected with an input to the system in a specified way to form the plurality of standard patterns, a matching rate comparison circuit for ranking an order of the matching rates between the to-be-identified pattern and the plurality of standard patterns being on a second layer and including a switched-current type order-ranking circuit for receiving switched-current signals, finding a maximum value through a network and outputting a time-division order-ranking result and an identification-rejection judgment circuit for making an absolute judgment and a relative judgment, and having a corresponding number of outputs to the inputs of the system, and a pulse-generating circuit for generating a series of sequential clock pulses required by the system.

In accordance with another aspect of the invention, there is provided a switched-current type of Hamming neural network system in which the matching rate comparison circuit sequentially outputs the matching rates according to the order thereof from high to low and the corresponding standard patterns for improving the performance of the system.

In accordance with still another aspect of the invention, there is provided a switched-current type of Hamming neural network system in which the matching rate comparison circuit uses a metal-oxide-semiconductor transistor as a storage device so as to be fully adapted to use a standard complementary metal-oxide-semiconductor such that the Hamming network can be easily integrated in a mixed analog/digital form and advantageously carries out a very large scale integrated circuit design by using a switched-current technique.

In accordance with yet another aspect of the invention, there is provided a switched-current type of Hamming neural network system in which the circuit construction of said Hamming neural network system is simple and flexible by using a modular design so as to be easily extendible in its circuit size.

In accordance with still yet another aspect of the invention, there is provided a switched-current type of Hamming neural network system in which the Hamming neural network system is of high precision due to high matching characteristics of mirror transistors and a clock feedthrough effect in switch currents.

In accordance with still another aspect of the invention, there is provided a switched-current type of Hamming neural network system in which the identification-rejection circuit performs both an absolute identification-rejection judgment and a relative identification-rejection judgment so as to greatly increase the reliability of the Hamming neural network system.

BRIEF DESCRIPTION OF THE DRAWINGS

The above objective, other features and advantages of the present invention will become more apparent by describing in detail the preferred embodiment thereof with reference to the attached drawings, in which.

DETAILED DESCRIPTION OF THE PREFERRED EMBODIMENT

Figure 1:
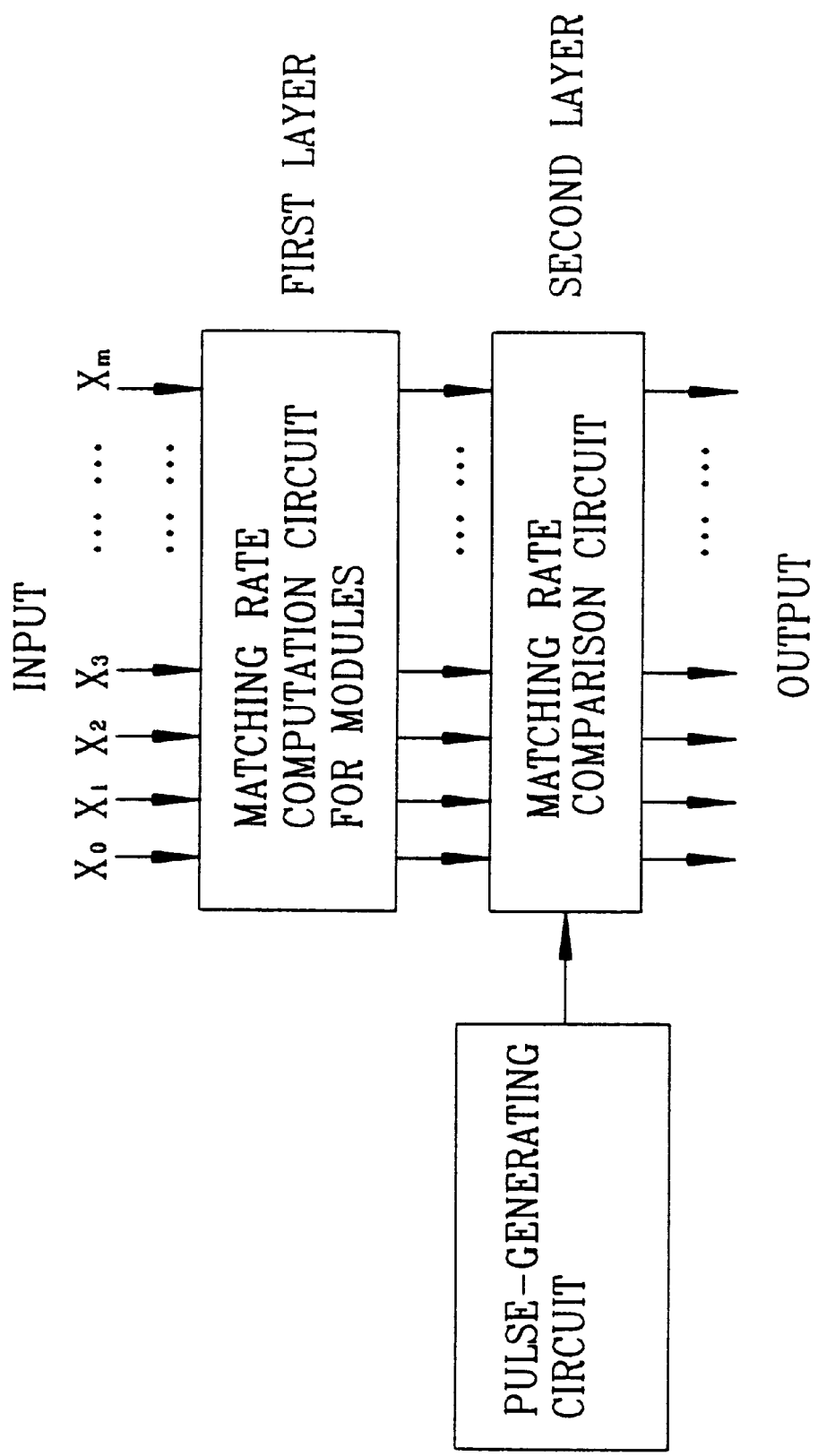
FIG. 1 is a schematic diagram showing a switched-current type of Hamming neural network system in a two-layer form in accordance with the present invention.

FIG. 1 schematically illustrates a switched-current type of Hamming neural network system constructed with a two-layer form, including a matching rate computation circuit 10 for modules being formed on a first layer and a matching rate comparison circuit 20 being formed on a second layer, and a pulse-generating circuit 30 for generating sequential clock pulses required by the system, and $X_0, X_1, X_2, \ldots, X_M$ are M+1 inputs to the system with the corresponding number of outputs.

1. The Matching Rate Computation Circuit for a Module

Figure 2:
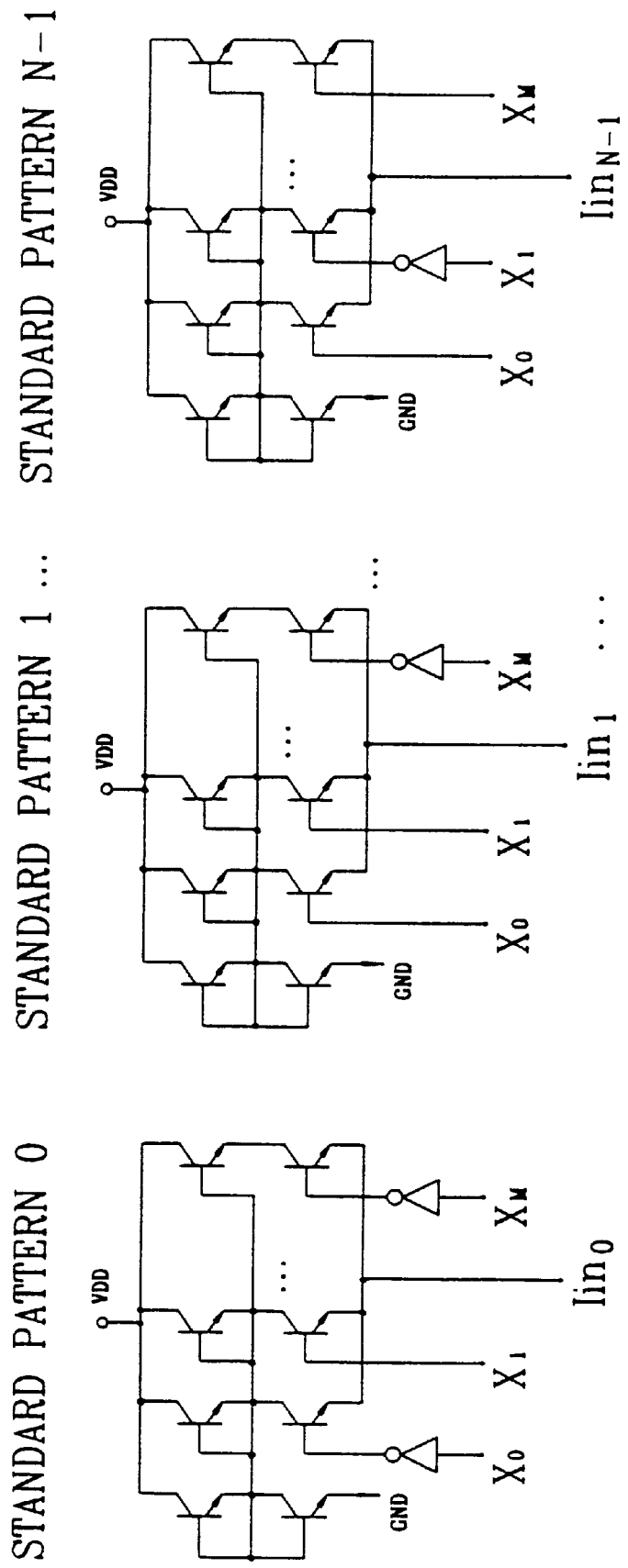
FIG. 2 is a schematic diagram showing a matching rate computation circuit for modules in accordance with the present invention.

In the matching rate computation circuit 10 for modules, as shown in FIG. 2, each neuron is composed of a current mirror including two transistors in a series connection. The ON/OFF state of the corresponding current mirror is determined by both of a to-be-identified pattern and a standard pattern. There are N kinds of standard patterns of modules, each of which is respectively stored in a respective input terminal of each neuron in the circuit 10 where an input terminal storing 1 of the corresponding current mirror is directly connected with the input to the system while an input terminal storing 0 is connected with the input to the system through an inverter. As illustrated in FIG. 2, a pattern of 01 . . . 0 is stored in a standard pattern 0, a pattern of 11 . . . 0 is stored in a standard pattern 1, . . . , and each of the output currents $\text{Iin}_i$, for $0 \leq \leq N-1$, is proportional to the corresponding matching rate between the to-be-identified pattern and the ith standard pattern. The larger the value of the $\text{Iin}_i$ is, the higher the matching rate between the to-be-identified pattern and the ith standard pattern is, that is, the to-be-identified pattern is more matchable with the ith standard pattern. For simplicity, the $\text{Iin}_i$ is defined as the matching rate between the to-be-identified pattern and the ith standard pattern.

2. The Matching Rate Comparison Circuit

The matching rate comparison circuit 20 ranks the order of the matching rates, $\text{Iin}_i$ for $0 \leq i \leq N-1$, between the N standard patterns and the to-be-identified pattern and then outputs a result of the matching rates according to the order from high to low, and generates a high-level pulse at an output terminal of the corresponding standard pattern. In addition, both an identification-rejection (IR) judgment and a relative IR judgment are made by the circuit 20.

Figure 3:
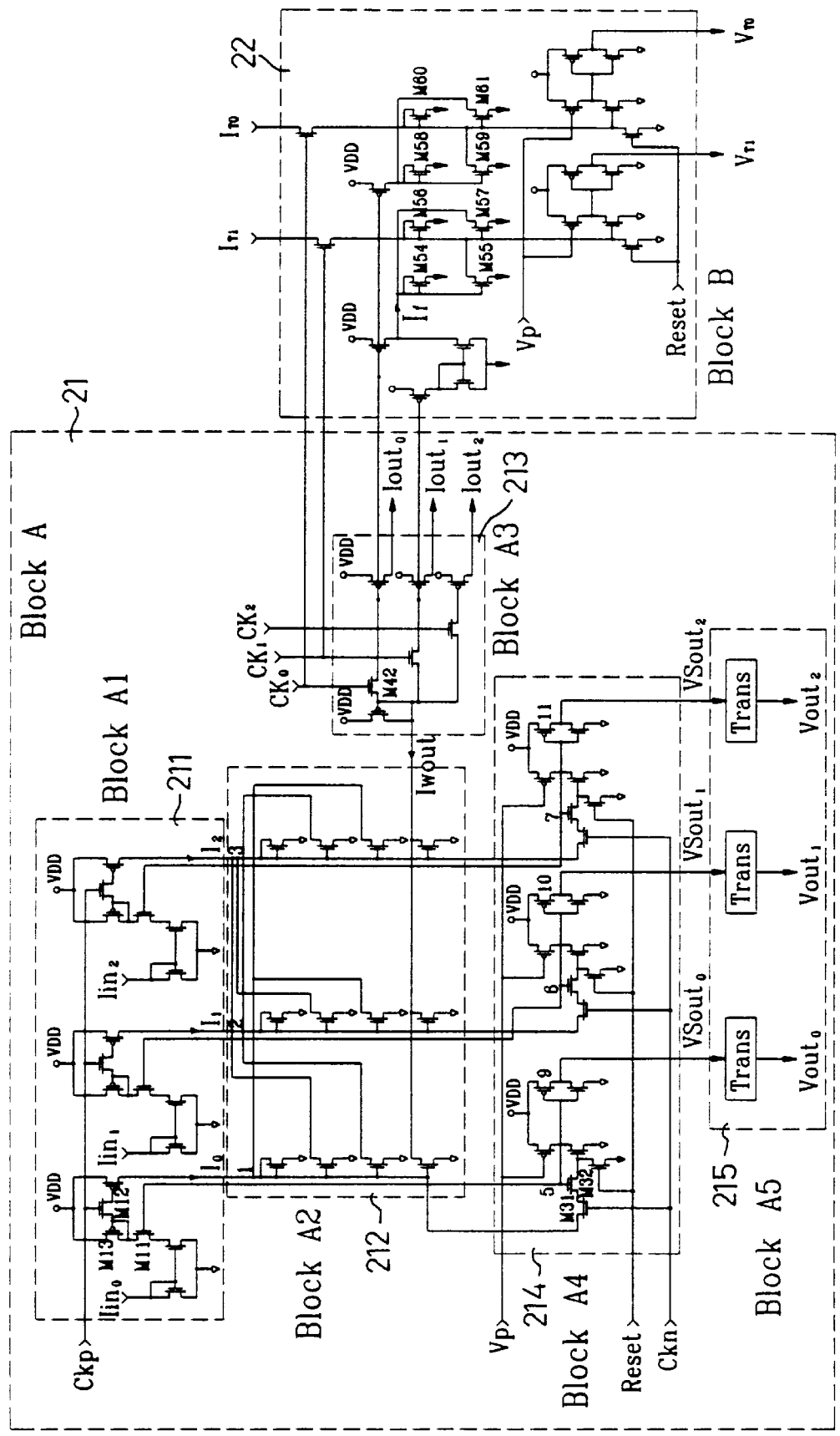
FIG. 3 is a schematic diagram showing a matching rate comparison circuit including a switched-current type order-ranking circuit and an identification-rejection judgment circuit in accordance with the present invention.
Figure 4:
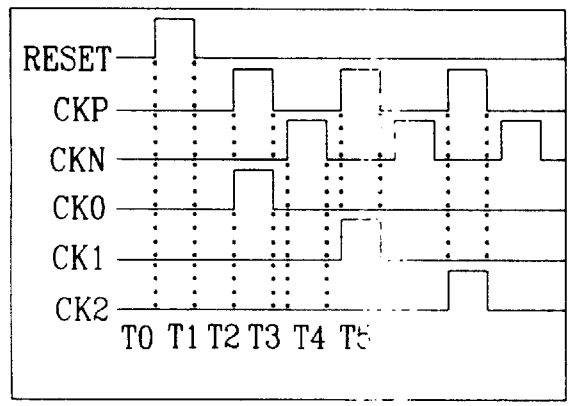
FIG. 4 is a timing diagram for a three-input matching rate comparison circuit in accordance with the present invention.

For simplicity, a three-input matching rate comparison circuit 20 is discussed, as shown in FIG. 3, and a timing diagram required by the above circuit 20 is shown in FIG. 4. The circuit 20 is composed of a switched-current type order-ranking circuit 21 and an IR judgment circuit 22.

In FIG. 3, a switched-current type order-ranking circuit 21 receives switched-current mirror tracking/holding input signals and finds a maximum through a fully symmetrical Winner-Take-All (WTA) circuit network, and finally outputs a time-division order-ranked result. The switched-current technique was put forth by Hughes et. al. in 1989. When comparing with a switched-capacitor circuit, the switched-current circuit 21 uses a metal-oxide-semiconductor (MOS) transistor as a storage device, which is fully adapted to use a standard digital complementary MOS (CMOS), easy to be integrated in a mixed analog/digital form and advantageous to carry out a very large scale integrated circuit (VLSI) design. An operational principle of the switched-current type order-ranking circuit 21 is analyzed as follows. Referring to FIG. 4, a high-level pulse is first generated at an input terminal RESET in a BLOCK A4 circuit 214 at time T0, that is, the voltage level at T0 is changed from low to high and the corresponding circuit is reset which makes the gate voltage level of each MOS transistor in the BLOCK A4 circuit 214 corresponding to $M_{n1}$ becomes low, the voltage levels at nodes 5, 6, 7 become high and the voltage levels at nodes 9, 10, 11 become low. The high level voltages at nodes 5, 6 and 7 make each switching transistor in a BLOCK A1 circuit 211 corresponding to $M_{11}$ and each switching transistor in the BLOCK A4 circuit 214 corresponding to $M_{32}$ to be conducted. At time T1, the voltage level at the input terminal RESET of the BLOCK A4 circuit 214 becomes low, the voltage levels at nodes 5, 6, 7 remain high and the voltage levels at nodes 9, 10, 11 remain low. At time T2, a first high level pulse is generated at an input terminal CKP of the BLOCK A1 circuit 211, which makes each switching transistor in the BLOCK A1 circuit 211 corresponding to $M_{12}$ to be conducted, and the input currents are mirror-reflected to the input terminals of a BLOCK A2 circuit 212. The BLOCK A2 circuit 212 shows a fully symmetrical three-input WTA maximum-finding circuit network in which all of the NMOS transistors are of the same size. This WTA circuit network is a side-restrained interconnection network with both of a high precision and a high speed, and an input terminal with a maximum current absorbs the currents from all other input terminals by mutual restrained operations among the input terminals such that the voltage level at the input terminal with the maximum current becomes high while the voltage levels at the other input terminals are restrained to become low at the same time as well as the maximum input current is outputted from an output terminal $I_{wout}$ of the BLOCK A2 circuit 212. Here, if $Iin_0$=max ($Iin_0,Iin_1,Iin_2$), the WTA obtains the maximum current by the side-restrained operation, that is, $I_{wout}$=$Iin_0$, and the voltage level at node 1 is changed to high and the voltage levels at nodes 2 and 3 are changed to low at the same time. Since the high-level pulses of CK0 and CKP are both generated at time T2 so that the switching transistor $M_{42}$ in the switched-current mirror of a BLOCK A3 circuit 213 is conducted, the maximum current is outputted by performing a mirror reflection operation such that $Iout_0$ is equal to $Iin_0$. At time T3, the voltage levels of CKP and CK0 become low, the output currents of the switched-current mirrors in the BLOCK A1 circuit 211 and BLOCK A3 circuit 213 are maintained and $Iout_0$ still remains to be equal to $Iin_0$. At time T4, The voltage level of CKN becomes high, each switching transistor in the BLOCK A4 circuit 214 corresponding to $M_{31}$ is conducted, the high-level voltage at node 1 enables the voltage level at node 5 to become low and the low-level voltages at nodes 2 and 3 enable the voltage levels at node 6 and 7 to remain high such that an output $VSout_0$ with a voltage level changing from low to high is outputted from a first output terminal of the BLOCK A4 circuit 214 and the voltages levels of other outputs $VSout_i$ (i=1,2) remain low. In order to be convenient for detecting and subsequently processing, a BLOCK A5 circuit 215 is a converting circuit which converts a jump voltage level to a high-level pulse output, in which a SW unit is a CMOS simulation circuit. In this way, the jump voltage level of the $VSout_0$ enables a high-level pulse output $Vout_0$ to be outputted from the BLOCK A5 circuit 215 so that an input terminal corresponding to the maximum current is determined by detecting the high-level pulse of the $Vout_i$, that is, a standard pattern with a maximum matching rate is obtained. Furthermore, the low-level voltage at node 5 enables the switching transistor $M_{32}$ to be cut off, which makes the voltage level at node 5 stay low all the times. Simultaneously, the low-level voltage at node 5 enables the switching transistor $M_{11}$ in the BLOCK A1 circuit 211 to be cut off, which makes a mirror output current of $Iin_0$ always zero, that is, the current of an $M_{03}$ branch in the BLOCK A1 circuit 211 is always zero. When a next high-level pulse is generated at CKP, the zero current of the $M_{03}$ branch makes $I_0$ to be zero, that is, $Iin_0$ will not affect the comparison results between the other two input currents. Thus, a second maximum value between the other two input currents $Iin_1$ and $Iin_2$ can be determined according to the above operation principle and an output $Iout_1$ is outputted from an output terminal of the BLOCK A3 circuit 213. Meanwhile, in the BLOCK A5 circuit 215, a high-level pulse is generated at an output terminal corresponding to the input terminal with the second maximum current. Therefore, the input currents are respectively outputted according to the order from large to small by performing a time-division mirror operation in the BLOCK A3 circuit 213, that is, $Iout_0>Iout_1>Iout_2$, while a high-level pulse is respectively generated at the corresponding output terminal in accordance with the order of the currents from large to small and the input terminals which respectively correspond to $Iout_i$ (i=0, 1, 2) can be determined after these pulses are detected.

Block B circuit is an IR judgment circuit 22 which performs an absolute and a relative judgment. Both two-input WTA circuits are respectively composed of NMOS transistors $M_{54}$–$M_{57}$ and $M_{58}$–$M_{61}$ in the BLOCK B circuit 22. $I_{T0}$ and $I_{T1}$ are respectively set to be an absolute threshold value and a relative threshold value. From the analysis described above, the output terminal outputs $Iout_0$ and holds it to be the maximum value among the $Iin_i$ after CK0 is inputted, the output terminal outputs $Iout_1$ and holds it to be the second maximum value among the $Iin_i$ after CK1 is inputted and $I_f$ is set to be equal to $Iout_0$–$Iout_1$. Therefore, if $Iout_0<I_{T0}$, a first output terminal $V_{T0}$ of the BLOCK B circuit outputs a high-level pulse, which is referred to as an absolute IR judgment, while if $I_f<I_{T1}$, a second output terminal $V_{T1}$ outputs a high-level pulse, which is referred to as a relative IR judgment.

From the above description, the Hamming neural network not only outputs the matching rates between the N standard patterns and the to-be-identified pattern according to a high to low order, but also asserts the relative standard pattern corresponding to the matching rate. Since the operation of the network is performed in a sequential control process, The number m of the standard patterns which are matchable with the to-be-identified pattern can be arbitrary selected by controlling the number m ($1 \leq m \leq N$) of the pulses of the CKN and CKP. When m=1, for example, the Hamming network can be simplified to become a typical Hamming network which is the one that outputs the standard pattern which is the most matchable with the to-be-identified pattern while when m=N, the Hamming network lists all of the standard patterns and the corresponding matching rates based on the order from the most to the least matchable with the to-be-identified pattern. This can be used for statistically processing how much the to-be-identified pattern to be matchable with all of the standard patterns. Since the Hamming neural network can make both the absolute and relative judgments, this will greatly increase the reliability of the system. Further, the circuit construction of the Hamming neural network is simple and flexible due to its use of modular design so as to be easily extendible in the circuit dimensions.

Primarily, the precision of the circuit is determined by the matching characteristics of the mirror-image transistors and the clock feedthrough effect in the switched current. For the clock feedthrough effect in the switched current, Various ways such as increasing the dimension of a storage transistor, replacing a single NMOS switching transistor by a dummy transistor, etc. are taken to reduce the influence of the clock feedthrough in order to enhance the precision of the circuit.

Figure 5:
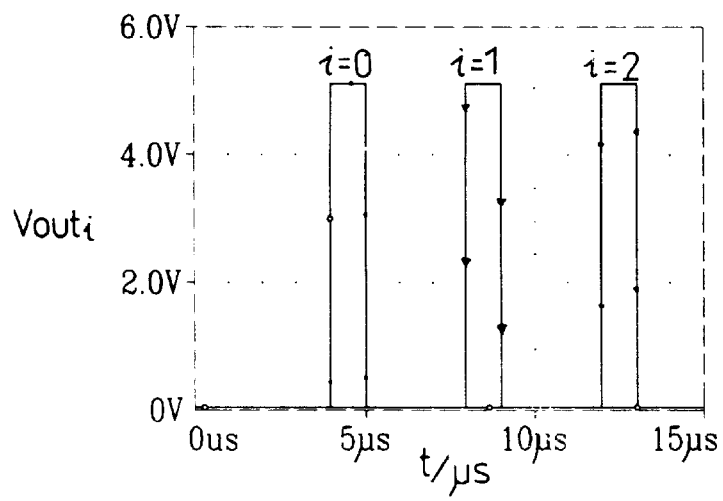
FIG. 5 shows a simulation result of the pulse shape of the output of the first case in Table 1.

The kernel of the switched-current type Hamming neural network is the matching rate comparison circuit. The simulation result for the matching rate comparison circuit by using the PSPICE software on a computer is given in Table 1. Table 1 respectively shows the PSPICE simulations for the input of the comparison circuit in several typical cases. In the first case, $Iin_i$(i=0,1,2) are 195 $\mu$A, 200 $\mu$A and 190 $\mu$A respectively. In the second case, $Iin_i$ are 145 $\mu$A, 150 $\mu$A and 140 $\mu$A respectively. In the third case, $Iin_i$ are 95 $\mu$A, 90 $\mu$A and 100 $\mu$A respectively. In the fourth case, $Iin_i$ are 20 $\mu$A, 25 $\mu$A and 15 $\mu$A respectively. The output results of $Iout_i$ (i=0,1,2) corresponding to the four cases and the maximum errors $\epsilon_{max}$ between the output currents and the corresponding input currents are also given in Table 1, in which one of the simulation results of the pulse shapes of the outputs $Vout_i$(i=0,1,2) in the first case is shown in FIG. 5.

While the present invention has been explained in relation to its preferred embodiment, it is to be understood that various modifications thereof will be apparent to those skilled in the art upon reading this specification. Therefore, it is to be understood that the invention disclosed herein is intended to cover all such modifications as fall within the scope of the appended claims.

I claim:

1. A switched-current type of a Hamming neural network system in a two-layer form, comprising:

a matching rate computation circuit for modules being on a first layer and used to compute a matching rate between a to-be-identified pattern and each one of a plurality of standard patterns defined by an output of a corresponding standard pattern, wherein each neuron is composed of a current mirror comprising two transistors in a series connection and an input terminal of each neuron is connected with an input to the system in a specified way to form the plurality of standard patterns;

a matching rate comparison circuit for ranking an order of the matching rates between the to-be-identified pattern and the plurality of standard patterns being on a second layer and comprising a switched-current type order-ranking circuit for receiving switched-current signals, finding a maximum value through a network and outputting a time-division order-ranking result and an identification-rejection judgment circuit for making an absolute and a relative judgments, and having a corresponding number of outputs to the inputs of the system; and a pulse-generating circuit for generating a series of sequential clock pulses required by the system.

2. The switched-current type of a Hamming neural network system as claimed in claim 1, wherein said specified way indicates an input terminal storing "1" of the neuron is connected with an input to the system directly and an input terminal storing "0" of the neuron is connected with an input to the system through an inverter.

3. The switched-current type of a Hamming neural network system as claimed in claim 1, wherein said network for finding a maximum is substantially a Winner-Take-All circuit network.

4. The switched-current type of a Hamming neural network system as claimed in claim 1, wherein said matching rate comparison circuit sequentially outputs the matching rates according to the order thereof from high to low and the corresponding standard patterns for improving the performance of the system.

5. The switched-current type of a Hamming neural network system as claimed in claim 1, wherein said matching rate comparison circuit uses a metal-oxide-semiconductor transistor as a storage device so as to be fully adapted to use a standard complementary metal-oxide-semiconductor such that the Hamming network is easily integrated in a mixed analog/digital form and advantageously carries out a very large integrated circuit design by using a switched-current technique.

6. The switched-current type of a Hamming neural network system as claimed in claim 1, wherein the circuit construction of said Hamming neural network system is simple and flexible by using a modular design so as to be easily extendible in its circuit size.

7. The switched-current type of a Hamming neural network system as claimed in claim 1, wherein the Hamming neural network system is of high precision due to high matching characteristics of mirror transistors and a clock feedthrough effect in switch currents.

8. The switched-current type of a Hamming neural network system as claimed in claim 1, wherein said identification-rejection circuit performing both an absolute identification-rejection judgment and a relative identification-rejection judgment so as to greatly increase the reliability of the Hamming neural network system.

* * * * *